United States Patent Office 3,558,662
Patented Jan. 26, 1971

3,558,662
5-NITRO-2-THIAZOLE-2-OXAZOLIDINONES
Hans Bruderer, Riehen, and Rudolf Rüegg, Bottmingen, Switzerland, assignors to Hoffmann-La Roche Inc., Nutley, N.J., a corporation of New Jersey
No Drawing. Filed July 18, 1968, Ser. No. 745,705
Claims priority, application Switzerland, Aug. 4, 1967, 11,057/67
Int. Cl. C07d 85/28
U.S. Cl. 260—306.8                                    9 Claims

ABSTRACT OF THE DISCLOSURE 3-(2-thiazolyl)-2-oxazolidinones which are useful as anthelmintics and their method of production from the reaction product of a 2-amino-thiazole with an ester of a haloformic acid including intermediates in this process.

SUMMARY OF THE INVENTION

In accordance with this invention, it has been found that compounds of the formula:

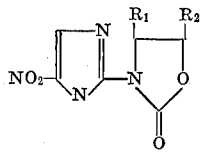

wherein $R_1$ and $R_2$ are individually selected from the group consisting of hydrogen, lower alkyl, lower alkenyl, lower alkynyl, lower cycloalkyl, and lower haloalkyl, and taken together are lower alkylene,
are useful as authelmintics.

The compounds of Formula I above are prepared by cyclizing a carbamate of the formula:

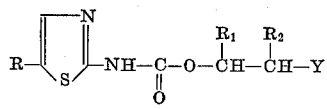

wherein $R_1$ and $R_2$ are as above, and Y is selected from the group consisting of halogen, aryl-sulphonyloxy or alkyl-sulphonyloxy and R is hydrogen or nitro.

In the case where R is hydrogen, the product of cyclization is subjected to nitration.

Among the carbamates of Formula II, carbamates having the formula:

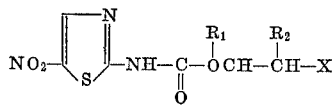

wherein $R_1$ and $R_2$ are as above, and X is a halogen,
are useful as anthelmintics in the same manner as the compounds of the Formula I above.

The compounds of Formula II above are prepared by the reaction of a thiazole of the formula:

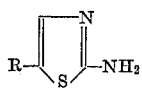

wherein R is as above, with a haloformic acid ester of the formula:

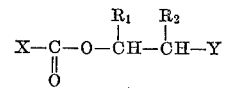

wherein $R_1$, $R_2$, X and Y are as above.

DETAILED DESCRIPTION

The term "halogen" includes bromine, chlorine, fluorine, and iodine, with chlorine being preferred. The term "lower alkyl" includes both straight and branched chain alkyl groups containing from 1 to 7 carbon atoms such as methyl, ethyl, propyl, isopropyl, n-hexyl, and the like. The term "lower alkenyl" includes both straight and branched chain alkenyl groups containing from 2 to 7 carbon atoms such as allyl, propenyl, 1-, 2- and 3-butenyl, and the like. The term "lower alkynyl" includes both straight and branched chain alkynyl groups having from 2 to 7 carbon atoms such as 1- or 2-propynyl, 1-, 2- or 3-butynyl and the like. The term "lower cycloalkyl" includes cycloalkyl groups containing from 3 to 7 carbon atoms such as cyclopropyl, cyclobutyl, cyclohexyl, and the like. The term "lower haloalkyl" includes haloalkyl groups containing from 1 to 7 carbon atoms such as chloromethyl, chloroisopropyl, bromohexyl and the like. The term "lower alkylene" includes alkylene groups containing from 2 to 7 carbon atoms such as propylene, butylene, hexamethylene, etc.

The term "alkylsulphonyloxy" as used herein, denotes lower alkylsulphonyloxy such as mesyloxy. The term "arylsulphonyloxy" includes phenylsulphonyloxy and lower alkyl substituted phenylsulphonyloxy such as tosyloxy.

Among the preferred class of oxazolidinones of Formula I above and the carbamates of Formulae II or II–A above, which are produced in accordance with this invention are those compounds of Formulae I, II or II–A above wherein one of $R_1$ and $R_2$ is either lower alkyl or lower haloalkyl, and the other of $R_1$ and $R_2$ is hydrogen.

Among the preferred compounds of Formulae I and II–A which can be produced in accordance with this invention, are included:

1-chloromethyl-3-methyl-butyl-5-nitro-2-thiazole-carbamate;
2-chloroethyl-5-nitro-2-thiazole-carbamate;
2-chloro-1-methyl-ethyl-5-nitro-2-thiazole-carbamate;
2-chloro-1-(chloromethyl)-ethyl-5-nitro-2-thiazole-carbamate;
2-chloro-1-cyclohexyl-methyl-5-nitro-2-thiazole-carbamate;
1-(chloromethyl)-3-butenyl-5-nitro-2-thiazole-carbamate;
1-(chloromethyl)-3-butynyl-5-nitro-2-thiazole-carbamate;
trans-2-chloro-cyclohexyl-5-nitro-2-thiazole-carbamate;
5-isobutyl-3-(5-nitro-2-thiazolyl)-2-ozaolidinone;
3-(5-nitro-2-thiazolyl)-2-oxazolidinone;
5-methyl-3-(5-nitro-2-thiazolyl)-2-oxazolidinone;
5-(chloromethyl)-3-(5-nitro-2-thiazolyl)-2-oxazolidinone;
hexahydro-3-(5-nitro-2-thiazolyl)-2-benzoxazolinone;
5-allyl-3-(5-nitro-2-thiazolyl)-2-oxazolidinone;
3-(2-propynyl)-3-(5-nitro-2-thiazolyl)-2-oxazolidinone;

As pointed out hereinabove, the compounds of Formulae I and II–A above are useful as anthelimintics. The compounds of Formulae I and II–A above possess Schistosomicidal and Trichomoacidal properties. The compounds of Formulae I and II–A above are especially valuable in the treatment of bilharziasis. Among the compounds of Formulae I and II-A which have particularly strong Schistosomicidally active properties are included:

1-(chloromethyl)-propyl-5-nitro-2-thiazole carbamate;
1-(chloromethyl)-2-methyl-propyl-5-nitro-2-thiazole-carbamate;
5-ethyl-3-(5-nitro-2-thiazolyl)-2-oxazolidinone;
1-chloromethyl-3-methyl-butyl-5-nitro-2-thiazole carbamate;
5-isobutyl-3-(5-nitro-2-thiazolyl)-2-oxazolidinone;

Both the compounds of Formulae I and II-A are used in the form of conventional pharmaceutical preparations which contain said compounds in connection with conventional pharmaceutical organic or inorganic carrier materials suitable for internal administration. The pharmaceutical compositions containing the compounds of Formulae I and II-A above can be administered parenterally or orally. Dosages can be adjusted to individual requirements, for example, these compounds can be administered in dosages of from about 10 mg./kg. to about 50 mg./kg. per day. These dosages can be administered in single dosage form or in divided dosage forms. The pharmaceutical compositions can contain such conventional organic or inorganic inert carrier materials such as water, gelatin, lactose, starch, magnesium stearate, talc, vegetable oils, gums, polyalkylene glycols or the like. The pharmaceutical preparations can be in conventional solid forms such as tablets, dragees, suppositories, capsules or in conventional liquid forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers, or the like. They can also contain other therapeutically useful materials.

The compounds of Formula IV above can be prepared by reacting for instance phosgene (in the case where the symbol X in Formula IV represents chlorine) with an alcohol of the formula:

wherein $R_1$, $R_2$ and Y are as above.

This reaction can be carried out at a temperature of from 0° C. to 35° C., preferably room temperature. For example, 1-chloro-3-methyl-2-butanol can be reacted with excess phosgene at a temperature of from 0° C. to room temperature to produce chloroformic acid 1-chloromethyl-isobutyl ester.

On the other hand, this reaction can be carried out by dissolving the alcohol of Formula VI in an inert organic solvent and reacting this solution with phosgene dissolved in an inert organic solvent in the presence of a proton acceptor. Any conventional proton acceptor can be utilized in carrying out this reaction. Among the conventional proton acceptors are included the organic amine bases such as pyridine, antipyrine, and dimethylaniline. Furthermore, any conventional inert organic solvent can be utilized in carrying out this reaction. For example, 1-chloro-2-butanol dissolved in an inert solvent such as methylene chloride can be reacted with about 1 mole of phosgene dissolved in an inert solvent such as toluene or methylene chloride in the presence of a proton acceptor such as pyridine to produce chloroformic acid 1-(chloromethyl)-propyl ester. This reaction can be carried out at 0–35° C.

The compound of the Formula II above is prepared by the reaction of a thiazole of the Formula III above with the haloformic acid ester of the Formula IV above. This reaction is generally carried out in the presence of an inert solvent. Any conventional inert organic solvent can be utilized. Among the conventional inert organic solvents which can be utilized are included, acetone, acetic acid ethyl ester, dioxan, tetrahydrofuran, etc. In carrying out this reaction, a proton acceptor may be present in the reaction medium. Any conventional proton acceptor such as the proton acceptors hereinbefore mentioned can be utilized in this reaction. Generally, this reaction can be carried out at a temperature of from 0° C. to the reflux temperature of the reaction mixture. If the reaction is carried out at a temperature of from 0° C. to about 35° C., it is preferable to carry out this reaction in the presence of a proton acceptor such as pyridine, antipyrine or dimethyl aniline.

If R in the compound of Formula II above is hydrogen, this compound can be nitrated by any conventional nitration technique to produce a compound of the Formula II above wherein R is nitro. Any conventional method of nitration such as treating the compound of Formula II above with a mixture of fuming nitric acid and concentrated sulphuric acid at a temperature of from about −10° C. to about 30° C., can be utilized in this process.

On the other hand, the compound of Formula II above wherein R is hydrogen can be cyclized and the cyclization product subjected to nitration in the manner hereinabove described to produce the compound of Formula I above.

The compound of Formula II above can be cyclized to the compound of Formula I above by treating the compound of Formula II above with a base. Generally, this reaction is carried out in an inert organic solvent. Any of the conventional inert organic solvents hereinbefore mentioned can be utilized in carrying out this reaction. Among the conventional solvents which can be utilized in accordance with this invention are included, dimethylformamide, acetone, tetrahydrofuran, dioxan, and methanol. In carrying out this reaction, any conventional base can be utilized. Among the conventional bases which can be utilized are included, the alkali or alkaline earth hydrides such as sodium hydride, potassium hydride, etc.; alkali carbonates such as potassium carbonate, sodium carbonate, etc.; alkali acetates such as sodium acetate, etc.; alkali alcoholates such as sodium methylate, potassium methylate, organic bases such as pyridine or triethylamine. In carrying out the cyclization reaction, temperatures of from about room temperature to the reflux temperature of the reaction mixture are generally utilized.

In a preferred method of carrying out the cyclization reaction, the carbamate of Formula II is dissolved in dimethylformamide and is treated with 1 mole of an alkali or alkaline earth metal hydride such as sodium hydride, and this mixture is stirred for one half to three hours at a temperature of from room temperature to the reflux temperature of the reaction mixture. Generally, it is preferred to carry out this reaction at a temperature of about 30° C. In accordance with another preferred embodiment of this invention, the carbamate of Formula II above can be dissolved in an inert solvent such as acetone, tetrahydrofuran, or dioxan, and cyclized to the corresponding ring-closed compound by treatment with either an inorganic base such as potassium carbonate, an alkali metal acetate such as sodium acetate or an organic base such as pyridine or triethylamine. Generally, it is preferable to carry out this reaction at the reflux temperature of the reaction mixture.

In accordance with another preferred embodiment of this invention, the carbamate of Formula II above is dissolved in an alkanol such as methanol and cyclized to the compound of Formula I above by treatment with an alkali metal alcoholate such as sodium methylate. Generally, it is preferred to carry out this cyclization reaction at the refluxe temperature of the reaction mixture.

The following examples are illustrative of the processes and compounds of the invention. All temperatures are in degrees centigrade. Concentrated sulphuric acid as used in the following examples, designates a solution containing about 96 percent by weight of sulphuric acid and about 4 percent by weight of water.

EXAMPLE 1

14.5 g. of 2-amino-5-nitro-thiazole are dissolved in 400 ml. of acetone and, after the addition of 8 ml. of pyridine, 14.5 grams of chloroformic acid β-chloroethyl ester are added to this reaction mixture under constant stirring. A slight temperature increase occurs. The reaction mixture is subsequently stirred at room temperature for an additional hour. After this period, the reaction mixture is evaporated. The residue remaining after evaporation is treated with 300 ml. of water. Thereafter, 75 ml. of 3 N hydrochloric acid is added to the residue while the residue is shaken for 10 minutes. The product, 2-chloroethyl-5-nitro-2-thiazolcarbamate which precipitates, is filtered off by suction, washed with water and dried at 50° C. in water-jet vacuum. The product is obtained as yellowish platelets. After re-solution from dimethylformamide, the product melts at 223 to 224° C.

EXAMPLE 2

2-amino-5-nitro-thiazole and chloroformic acid 2-fluoro-ethyl ester are reacted to produce 2-fluoroethyl-5-nitro-2-thiazole-carbamate, M.P. 219–220° C. by the procedure of Example 1.

EXAMPLE 3

2-amino - 5 - nitro - thiazole and chloroformic acid-2-chloro-1-cyclohexyl-ethyl ester are reacted to produce 2-chloro-1-cyclohexyl-ethyl -5-nitro-2-thiazole - carbamate, M.P. 180–181° C., by the procedure of Example 1.

EXAMPLE 4

10 g. of 2-amino-thiazole are dissolved in 400 ml. of acetone and, after the addition of 8 ml. of pyridine, 14.5 grams of chloroformic acid 2-chloroethyl ester are added to the reaction mixture under constant stirring. The reaction mixture is subsequently stirred for an additional 30 minutes. After this period, the reaction mixture is evaporated. The residue remaining after evaporation is treated with 300 ml. of water. Thereafter, the residue is treated with 75 ml. of 3 N hydrochloric acid while it is shaken for 10 minutes. The 2-chloroethyl-2-thiazol-carbamate which precipitates melts at 169–170° C. after re-solution from ethanol.

5.2 g. of 2-chloroethyl-2-thiazol-carbamate are dissolved at 10° C. with stirring in 75 ml. of conc. sulphuric acid. 11.6 ml. of fuming nitric acid are subsequently added dropwise at this temperature during a 1 hour period. The reaction mixture is stirred for an additional 12 hours and subsequently poured into 500 ml. of ice water. The 2-chloroethyl-5-nitro-2-thiazol-carbamate which precipitates is washed with water and redissolved from dimethylformamide, M.P. 223–224° C.

EXAMPLE 5

29.0 g. of 2-amino-5-nitro-thiazole in 300 ml. of toluene are treated for a period of 15 minutes with stirring with a solution of 40 g. of chloroformic acid 2-bromo-ethyl ester in 50 ml. of toluene. The reaction mixture is stirred at 110° C. for 2 hours and then cooled. The 2-bromo-ethyl-5-nitro-2-thiazole-carbamate which precipitates when the reaction mixture is cooled, is washed with toluene and diethyl ether and redissolved from a mixture of 700 ml. of acetonitrile and 50 ml. of dimethylformamide, M.P. 188–190° C.

EXAMPLE 6

13.3 g. of 2-amino-5-nitro-thiazole are dissolved at 110° C. with stirring in 250 ml. of nitrobenzene. Within 30 minutes, 14.3 g. of chloroformic acid 1-(chloromethyl)-ethyl ester are added to the solution. The resulting reaction mixture is stirred at 110° C. for 12 hours, then cooled, filtered and evaporated. The residue remaining after evaporation is dissolved in 500 ml. of water and thereafter treated with 50 ml. of 3 N hydrochloric acid. The 2-chloro-1-methyl-ethyl-5-nitro-2-thiazole-carbamate which precipitates from the solution as yellow crystals melts at 156–158° C. after recrystallization from ethanol.

EXAMPLE 7

2-amino-5-nitro-thiazole and chloroformic acid 1-(chloromethyl)-2-chloroethyl ester are reacted to produce 2 - chloro - 1-(chloromethyl)-ethyl-5-nitro-2-thiazole-carbamate, M.P. 175–176° C. by the same procedure given in Example 6.

EXAMPLE 8

29.7 g. of 2-amino-5-nitro-thiazole are dissolved in 500 ml. of acetone. To this solution 16 ml. of pyridine and 25 g. of chloroformic acid 1-(chloromethyl)-propyl ester are successively added under constant stirring. The resulting reaction mixture is stirred at 50° C. for 2 hours and then evaporated to about 100 ml. The 1-(chloromethyl)-propyl - 5 - nitro-2-thiazole-carbamate which precipitates from the concentrate after the addition of 200 ml. of 3 N hydrochloric acid is washed with water and with 3 N hydrochloric acid and redissolved twice from ethanol, M.P. 138–139° C.

EXAMPLE 9

41 g. of 2-amino-5-nitro-thiazole are dissolved in 600 ml. of acetone. To this solution 23 ml. of pyridine and 52 g. of chloroformic acid 1-(chloromethyl)-isobutyl ester were successively added under constant stirring. The resulting reaction mixture is stirred for 30 minutes and then evaporated. The residual crystalline product 1-(chloromethyl) - 2 - methyl-propyl-5-nitro-2-thiazole-carbamate, which remains after evaporation, is first shaken with 100 ml. of 3 N hydrochloric acid, thereafter washed with water and 3 N hydrochloric acid and finally redissolved from ethanol. The final product which is redissolved from alcohol, has a M.P. of 167–168° C.

EXAMPLE 10

The following 5-nitro-2-thiazole-carbamates were prepared by the reaction of 2-amino-5-nitro-thiazole and a chloroformic acid ester utilizing the procedure of Example 9;

from the reaction of 2-amino-5-nitro-thiazole and chloroformic acid 1-(chloromethyl)-butyl ester, there is produced 1 - (chloromethyl) - butyl-5-nitro-2-thiazole-carbamate, M.P. 144–145° C.

from the reaction of 2-amino-5-nitro-thiazole and chloroformic acid 1-(chloromethyl)-amyl ester, there is produced 1 - (chloromethyl)-pentyl-5-nitro-2-thiazole-carbamate, M.P. 144–146° C.

from the reaction of 2-amino-5-nitro-thiazole and chloroformic acid 1-(chloromethyl)-isoamyl ester, there is produced 1 - (chloromethyl)-3-methyl-butyl-5-nitro-2-thiazole-carbamate, M.P. 145–146° C.

from the reaction of 2-amino-5-nitro-thiazole and chloroformic acid 1-(chloromethyl)-3-butenyl ester, there is produced 1-(chloromethyl)-3-butenyl-5-nitro-2-thiazole carbamate, M.P. 139–140° C.

from the reaction of 2-amino-5-nitro-thiazole and chloroformic acid 1-(chloromethyl)-3-butynyl ester, there is produced 1 - (chloromethyl)-3-butynyl-5-nitro-2-thiazole-carbamate, M.P. 170–171° C.

from the reaction of 2-amino-5-nitro-thiazole and chloroformic acid 2-chlorocyclohexyl ester, there is produced trans - 2 - chloro - cyclohexyl-5-nitro-2-thiazole-carbamate, M.P. 204–205° C.

EXAMPLE 11

A solution of 40.3 g. of 2-chloroethyl-5-nitro-2-thiazole-carbamate in 400 ml. of abs. dimethylformamide heated to 40° C. is added dropwise to a suspension of 4.0 g. of sodium hydride in 100 ml. of abs. dimethylformamide. The temperature during this addition is maintained at 40–45° C. The reaction mixture is stirred for 30 minutes, then treated with 50 ml. of ethanol. The pH of the reaction mixture is adjusted to pH 5 by the addition of 3 N hydrochloric acid. The solvent is subsequent evaporated off under reduced pressure. The product 3-(5-nitro-2-thiazolyl)-2-oxazolidinone which remains after evaporation is sucessively washed with water and ethanol and redissolved from acetonitrile. This product has a melting point of 198–199° C.

EXAMPLE 12

The procedure of Example 11 is utilized to cyclize the following carbamates into the following oxazolidinones:

from 1-(chloromethyl)-3-methyl-butyl-5-nitro-2-thiozole-carbamate, there is produced 5-isobutyl-3-(5-nitro-2-thiazolyl)-2-oxazolidinone, M.P. 133–134° C.

from 2 - chloro - 1-methyl-ethyl-5-nitro-2-thiazole-carbamate, there is produced 5-methyl-3-(5-nitro-2-thiazolyl)-2-oxazolidinone, M. P. 152–154° C.

from 2 - chloro-1-(chloromethyl)-ethyl-5-nitro-2-thiazole-carbamate, there is produced 5-(chloromethyl)-3-(5-nitro-2-thiazolyl)-2-oxazolidinone, M.P. 198–199° C.

from 1 - chloromethyl) - propyl-5-nitro-2-thiazole-carbamate, there is produced 5-ethyl-3-(5-nitro-2-thiazolyl)-2-oxazolidinone, M.P. 117–188° C.

from 1 - (chloromethyl)-2-methyl-propyl-5-nitro-2-thiazole-carbamate there is produced 5-isopropyl-3-(5-nitro-2-thiazolyl)-2-oxazolidinone, M.P. 134–135° C.

from 2 - chloro-1-cyclohexyl-ethyl-5-nitro-2-thiazole-carbamate, there is produced 5-cyclohexyl-3-(5-nitro-2-thiazolyl)-2-oxazolidinone, M.P. 153–154° C.

from 1 - (chloromethyl)-3-butenyl-5-nitro-2-thiazole-carbamate, there is produced 5-allyl-3-(5-nitro-2-thiazolyl)-2-oxazolidinone, M.P. 143–144° C.

from 1 - (chloromethyl)-3-butenyl-5-nitro-2-thiazole-carbamate, there is produced 5-(2-propynyl)-3-(5-nitro-2-thiazolyl)-2-oxazolidinone, M.P. 184–185° C.

from trans - 2-chloro-cyclohexyl-5-nitro-2-thiazole-carbamate, there is produced hexahydro-3-(5-nitro-2-thiazolyl)-2-benzoxazolinone, M.P. 134–135° C.

EXAMPLE 13

3.9 g. of 2-[(p-tolylsulphonyl)-oxy]-ethyl-5-nitro-2-thiazole-carbamate are dissolved in 100 ml. of dimethylformamide, treated with 0.5 g. of sodium hydride and stirred at 60° C. for 1 hour. The reaction mixture is treated with 50 ml. of ethanol and adjusted to pH 5 by the addition of 3 N hydrochloric acid. The solvent is evaporated off under reduced pressure. The residual 3-(5-nitro-2-thiazolyl)-2-oxazolidinone which is obtained after evaporation is identical with the compound obtained according to Example 11 and melts at 198–199° C.

The 2-[(p-tolyl-sulphonyl)-oxy]-ethyl - 5 - nitro-2-thiazole-carbamate employed as the starting compound can, for example, be manufactured as follows:

36 g. of ethyleneglycol monotosylate are treated at 0° with an excess of phosgene. The reaction mixture is stirred at room temperature for 12 hours. The excess phosgene is sucked off under reduced pressure to produce crystalline chloroformic acid 2-(p-toluenesulphonyloxy)-ethyl ester (M.P. 71–72° C.) as residue.

32.5 g. of chloroformic acid 2-(p-toluenesulphonyloxy)-ethyl ester are dissolved in 100 ml. of acetone. This solution is introduced into a solution of 16.5 g. of 2-amino-5-nitro-thiazole in 400 ml. of acetone which has had 9.2 ml. of pyridine added thereto. The reaction mixture is stirred for 30 minutes and treated with 200 ml. of water. The 2-[(p - tolylsulphonyl)-oxy]-ethyl-5-nitro-2-thiazole-carbamate which precipitates is washed successively with water, ethanol and diethyl ether and redissolved from dimethylformamide, M.P. 198–199° C.

EXAMPLE 14

20 g. of 3-(2-thiazolyl)-2-oxazolidinone are dissolved at 10° C., with stirring, in 35 ml. of concentrated sulphuric acid and treated at this temperature with 5.5 ml. of fuming nitric acid. The reaction mixture is stirred for 3 hours at 10° C. and for 12 hours at room temperature and then poured into ice-water. The 3-(5-nitro - 2 - thiazolyl)-2-oxazolidinone which precipitates is identical with the compound produced according to Example 13, M.P. 198–199° C.

The 3-(2-thiazolyl)-2-oxazolidinone employed as starting compound can, for example, be produced by the cyclization of the 2-chloroethyl-2-thiazolcarbamate which is produced in accordance with Example 4. The cyclization is carried out in accordance with Example 13.

EXAMPLE 15

This example is directed to the preparation of capsules of the following composition:

|  | Mg. |
|---|---|
| 5-isobutyl-3-(5-nitro-2-thiozolyl)-2-oxazolidinone | 250.0 |
| Lactose | 155.0 |
| Corn starch | 30.0 |
| Talcum | 15.0 |
|  | 450.0 |

The active substance is homogeneously mixed with the lactose and the corn starch, passed through a sieving machine and, after intermixing of the talcum, filled into No. 4 gelatin capsules.

|  | Mg. |
|---|---|
| Capsule fill-weight | 450 |
| Active substance content | 250 |

EXAMPLE 16

This example is directed to the preparation of tablets of the following composition:

|  | Mg. |
|---|---|
| 1-(chloromethyl)-3-methyl-butyl - 5 - nitro-2-thiazole-carbamate | 250.0 |
| Lactose | 100.0 |
| Corn starch | 85.0 |
| Ethylcellulose | 10.0 |
| Talcum | 4.5 |
| Magnesium stearate | 0.5 |
|  | 450.0 |

The active substance is mixed with the lactose and the corn starch and granulated with a solution of the ethylcellulose in 40 ml. of methylene chloride. The granulate is dried at 40° C., mixed with the talcum and magnesium stearate and pressed to tablets.

|  | Mg. |
|---|---|
| Weight of one tablet | 450 |
| Active substance content of one tablet | 250 |

EXAMPLE 17

This example is directed to showing the acute toxicity and anthelmintic properties of the compounds of this invention.

The $LD_{50}$ given in the following table is the mean lethal dose in mice. The $LD_{50}$ is determined by the method of Miller and Tainter, Proc. Soc. Med. and Bio. 57: 261, 1944.

The $VD_{50}$ given in the following table is the vermicide dose in hamsters infected with Schistosoma mansoni. This dose was determined by the means set forth in Ann. Trop. Med. Parasit., 47 pp. 26–43 (1953), Standen.

The effectiveness of the compounds given in the following table against Schistosoma mansoni was determined by the following test:

Hamsters were infected by a subcutaneous injection of approximately 100 cercariae of a Liberian strain of Schistosoma mansoni. Groups of 10–20 infected hamsters were treated 6 weeks after infection, once daily for 5 consecutive days with one of the compouds set forth in the following table. Two to three weeks after the end of treatment, the animals were autopsied, the worm pairs in mesenteric veins, portal vein and liver counted and their distribution in these three sites expressed as percentage of the total number found. Whereas in untreated control animals 60–70 percent of the worm pairs are found in the mesenteric veins, 25–35 percent in the portal vein and only 2–5 percent in the liver, active drugs provoke a shift of up to 100 percent of the worm pairs towards the liver where up to 100 percent may be found dead. Drug activity is expressed as the 50 percent vermicidal dose ($VD_{50}$), i.e., the daily dose necessary to kill 50 percent of worm pairs in a group of treated animals. For the determination of the $VD_{50}$, the drugs were administered at different dose levels, the values obtained plotted on logarithmic probit graph paper and the presumptive $VD_{50}$ interpolated.

The results of the above test are given in the following table:

TABLE I
[Activity against *Schistosoma mansoni*]

| Compound | $LD_{50}$ (mg./kg. p. o.) | $VD_{50}$ (mg./kg. p. o.) |
|---|---|---|
| 2-chloroethyl-5-nitro-2-thiazolecarbamate | >5,000 | 440 |
| 3-(5-nitro-2-thiazole)-2-oxazolidinone | >5,000 | 450 |
| 2-chloro-1-methyl-ethyl-5-nitro-2-thiazole-carbamate | >600 | 340 |
| 1-(chloromethyl)-propyl-5-nitro-2-thiazole-carbamate | >1,250 | 380 |
| 5-isopropyl-3-(5-nitro-2-thiazole)-2-oxazolidinone | >5,000 | 300 |
| 1-(chloromethyl)-3-methyl-butyl-5-nitro-2-thiazole-carbamate | >5,000 | 290 |
| 1-chloromethyl-3-butenyl-5-nitro-2-thiazole-carbamate | >2,500 | 510 |
| 1-chloromethyl-3-butynyl-5-nitro-2-thiazole-carbamate | >2,500 | 540 |
| 5-isobutyl-3-(5-nitro-2-thiazole)-2-oxazolidinone | >1,250 | 260 |
| 5-allyl-3-(5-nitro-2-thiazole)-2-oxazolidinone | >2,500 | |

We claim:

1. An oxazolidinone of the formula:

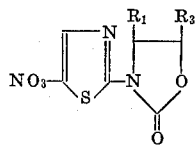

wherein
$R_1$ is hydrogen; and $R_2$ is hydrogen, lower alkyl, lower alkenyl, lower alkynyl, lower cycloalkyl and monochloro substituted lower alkyl and taken together with $R_1$ form lower alkylene.

2. A compound in accordance with claim 1, wherein $R_2$ is monochloro substituted lower alkyl.

3. A compound in accordance with claim 1, wherein $R_2$ is lower alkyl.

4. A compound in accordance with claim 1, wherein said compound is 3-(5-nitro-2-thiazolyl)-2-oxazolidinone.

5. A compound in accordance with claim 2, wherein said compound is 5-(chloromethyl)-3-(5-nitro-2-thiazolyl)-2-oxazolidinone.

6. A compound in accordance with claim 3, wherein said compound is 5-methyl-3-(5-nitro-2-thiazolyl)-2-oxazolidinone.

7. A compound in accordance with claim 3, wherein said compound is 5 - isopropyl-3-(5-nitro-2-thiazolyl)-2-oxazolidinone.

8. A compound in accordance with claim 3, wherein said compound is 5 - ethyl - 3 - (5-nitro-2-thiazolyl)-2-oxazolidinone.

9. A compound in accordance with claim 3, wherein said compound is 5-isobutyl-3-(5-nitro-2 - thiazole) - 2-oxazolidinone.

References Cited

UNITED STATES PATENTS 3,113,947  12/1963  Currie _____ 260—306.8

OTHER REFERENCES

Elderfield: Heterocyclic Compounds, vol. 5, Wiley, 1957, p. 398.

ALEX MAZEL, Primary Examiner

R. J. GALLAGHER, Assistant Examiner

U.S. Cl. X.R.

260—456, 463, 487; 424—270

PO-1050
(5/69)

UNITED STATES PATENT OFFICE
CERTIFICATE OF CORRECTION

Patent No. 3,558,662        Dated January 26, 1971

Inventor(s) Bruderer and Rüegg

It is certified that error appears in the above-identified patent and that said Letters Patent are hereby corrected as shown below:

Column 9, line 35, Claim 1

"
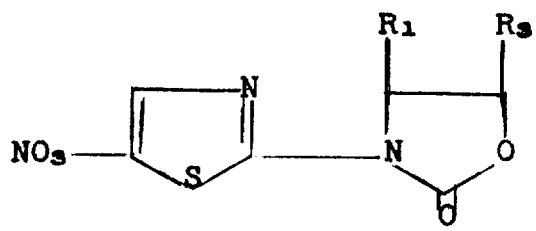
"

should be

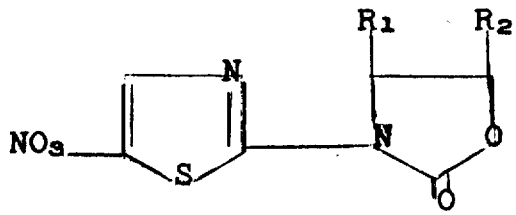

Signed and sealed this 15th day of June 1971.

(SEAL)
Attest:

EDWARD M. FLETCHER, JR.
Attesting Officer

WILLIAM E. SCHUYLER, J
Commissioner of Patent